(12) United States Patent
Cheng et al.

(10) Patent No.: US 9,602,763 B1
(45) Date of Patent: Mar. 21, 2017

(54) FRAME INTERPOLATION USING PIXEL ADAPTIVE BLENDING

(75) Inventors: Guohua Cheng, Shanghai (CN); Yanxin Li, Shanghai (CN); Neil D. Woodall, Newport Beach, CA (US); Bob Zhang, Santa Clara, CA (US)

(73) Assignee: PIXELWORKS, INC., Portland, OR (US)

( * ) Notice: Subject to any disclaimer, the term of this patent is extended or adjusted under 35 U.S.C. 154(b) by 1033 days.

(21) Appl. No.: 13/327,652

(22) Filed: Dec. 15, 2011

Related U.S. Application Data

(63) Continuation of application No. 12/970,822, filed on Dec. 16, 2010, now abandoned.

(51) Int. Cl.
*H04N 7/01* (2006.01)
*H04N 19/61* (2014.01)

(52) U.S. Cl.
CPC .......... *H04N 7/014* (2013.01); *H04N 19/61* (2014.11)

(58) Field of Classification Search
None
See application file for complete search history.

(56) References Cited

U.S. PATENT DOCUMENTS

| | | | |
|---|---|---|---|
| 8,135,069 B2* | 3/2012 | Jeon et al. | H04N 19/56 375/240.16 |
| 8,184,200 B1* | 5/2012 | Biswas et al. | 348/459 |
| 8,477,848 B1* | 7/2013 | Patankar et al. | 375/240.16 |
| 2002/0186889 A1* | 12/2002 | De Haan et al. | 382/236 |
| 2003/0202605 A1* | 10/2003 | Hazra et al. | 375/240.26 |
| 2006/0193535 A1* | 8/2006 | Mishima et al. | G06K 9/6206 382/294 |
| 2009/0060041 A1* | 3/2009 | Lertrattanapanich et al. | 375/240.16 |
| 2009/0167935 A1* | 7/2009 | Chen et al. | H04N 7/0132 348/441 |
| 2009/0208123 A1* | 8/2009 | Doswald | 382/236 |
| 2009/0231314 A1* | 9/2009 | Hanaoka et al. | G09G 3/2096 345/208 |
| 2009/0296814 A1* | 12/2009 | Lin et al. | 375/240.16 |
| 2010/0177974 A1* | 7/2010 | Chen et al. | 382/236 |

\* cited by examiner

*Primary Examiner* — Peter D Le
(74) *Attorney, Agent, or Firm* — Marger Johnson

(57) ABSTRACT

An apparatus has a neighbor motion vector module arranged to receive motion vector data for blocks that neighbor a current pixel and select a predetermined number of block motion vectors, at least two pixel motion vector modules arranged to receive the block motion vector data and to produce interpolated pixel motion vector data, a weighting module configured to produce a weighting for the interpolated pixel motion vector data from the motion vector modules, and a blending module to blend the interpolated pixel motion vector data according to the weighting and to produce pixel output data for the current pixel.

18 Claims, 5 Drawing Sheets

FRAME INTERPOLATION USING PIXEL ADAPTIVE BLENDING

CROSS-REFERENCE TO RELATED APPLICATIONS

This application is a Continuation of co-pending U.S. application Ser. No. 12/970,822, filed Dec. 16, 2010, entitled FRAME INTERPOLATION USING PIXEL ADAPTIVE BLENDING, the disclosure of which is herein incorporated by reference in its entirety.

BACKGROUND

Frame interpolation creates an image frame from neighboring images. The neighboring images may be fields in an interlaced video format, used to form a frame of data, or neighboring frames of a soon-to-be-created frame.

In the simplest approach, one could increase the frame rate by repeating the most recent frame until the next frame is ready for display. However, this does not account for moving objects which may appear to jump from frame to frame and have flickering artifacts.

Motion estimation and motion compensation techniques may alleviate some of these issues. These techniques rely upon motion vectors to shift the image data for the moving object to the correct position in interpolated frames, thereby compensating for the motion of the object. Difficulties arise in the estimation of motion and the selection of the correct motion vector in the regions of the image where the moving object resides. These regions may have background areas that are initially uncovered in the background, but become covered by the object in motion. Similarly, these background regions may be initially covered by the object, and then become uncovered as the object moves away. In either case, selection of motion vectors becomes difficult. These regions will be referred to as 'occluded.'

Motion estimation and motion compensation techniques may rely upon motion vectors to ensure that the interpolated frame's pixel data correctly depicts the motion of the object. Some approaches using motion vectors may determine motion vectors for blocks of pixels in the image data. The motion vector, previous frame and current frame data and occlusion information are used to interpolate the new frame.

At the boundary of objects, the correct motion vector for a particular pixel may actually reside in an adjacent block. For approaches that blend motion vectors from neighboring blocks, this may result in the wrong motion vector for several pixels. Boundaries are typically also occluded areas, so just selecting a motion vector having the lowest pixel difference between the two frames may not work. The pixel may be in a covered area in one frame and an uncovered area in the next frame, resulting in a large pixel difference. Selecting an improper motion vector affects the resulting image data.

DETAILED DESCRIPTION OF THE EMBODIMENTS

Generally, the motion calculation and motion estimation process results in a set of motion vectors for an interpolated frame, occlusion information, a background motion vector and some measure of confidence about the background motion vector. Typically, this information is associated with corresponding blocks of data in the interpolated frame. The motion vectors, for example, typically correspond to the blocks of data.

Occlusion information may include an indication whether a block is occluded. An occluded block is one that is either a cover block, meaning it is covered by a moving object, or an uncover block, meaning that it becomes uncovered. Both of these events occur in the time between the current frame and the previous frame, resulting in a difficulty in determining the proper motion vector. In addition to the occlusion indication, the occlusion information may also include a measure of the confidence of the occlusion information.

Similarly, the background motion vector may also have a confidence measure as to the confidence as to whether the background motion vector is the correct background motion vector for a block. The discussion here will refer to these measures and elements with abbreviations for ease of discussion. However, no limitation as to the nature of the measures or vectors is intended by these abbreviations, not should any be implied.

The block motion vectors, the occlusion confidence measure, the background motion vector and the background confidence measure may be provided to the frame interpolation system in one of many manners. Examples of the production of these measures and elements may be found in co-pending U.S. patent application Ser. Nos. 13/327,634, and 13/327,652. As mentioned above, these are merely examples of methods and apparatus that can produce the inputs to the frame interpolation system.

Figure 1:
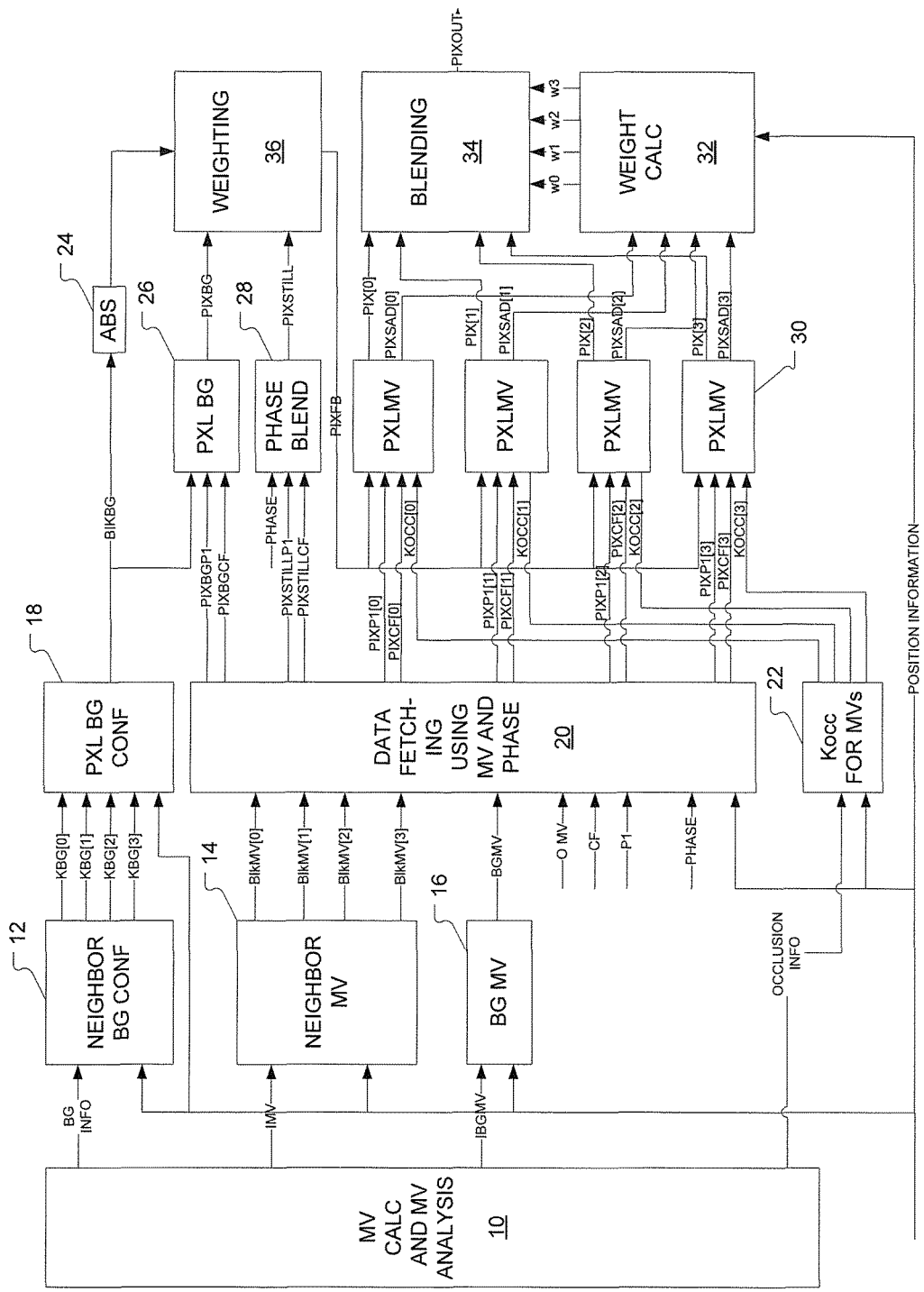
FIG. 1 shows an embodiment of a system to perform frame interpolation of image data using pixel adaptive blending.

FIG. 1 shows an embodiment of a frame interpolation system. The system receives a background motion vector confidence measure, referred to here as Kbg, an interpolated motion vector, IMV, and interpolated background motion vector, IBGMV, and an occlusion confidence measure, Kocc. These result from the motion vector Calculation and Motion Vector Analysis module 10, which may actually be one or more integrated circuits, processors, etc., including a portion of a current processor upon which the frame interpolation system may be implemented.

Figure 2:
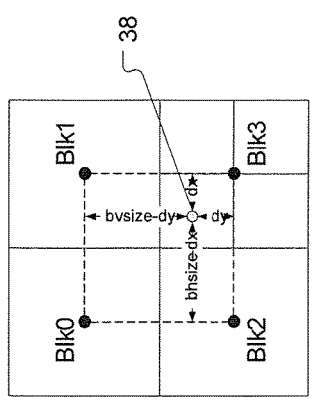
FIG. 2 shows an example of a current pixel and its neighbor information.

Generally, the approach here will calculate a fallback signal, pixfb, a fallback pixel value. Module 12 collects background motion vector confidence measure Kbg of neighboring blocks according to position information. Using the background confidence measure Kbg and position information, the pixel background confidence module 18 will produce pixel background confidence measures bikbg according position information for each pixel. Referring to FIG. 2, one can see the neighbor motion vectors for the current pixel 38. In this instance, the current block, Blk3, is a neighbor block. The discussion may also refer to it as the current block, depending upon the context. The other blocks, Blk1, Blk2, and Blk0, are the neighbor blocks to the current pixel.

After producing the fallback pixel value pixfb, the overall approach will blend the previous frame and current frame data with neighbor blocks' motion vectors, according to the occlusion confidence measure kocc. The pixel-level results of neighbor blocks' motion vectors will later be adjusted according to pixfb.

Next, a weights calculation module provides a weighting for the pixel-level data for each neighbor block's motion vectors. The pixel-level data for the neighbor blocks' motion vector is then blended according to the weighting and the final pixel output value for the current pixel results.

In FIG. 1, the information received from the motion vector calculation and analysis module 10 is block based, as mentioned previously. For a given pixel such as 38 in FIG. 2, some information will be processed again to get pixel level information. Module 12, the neighbor background confidence module, will take the background motion vector confidence measure kbg around current the position for the current pixel. The pixel background confidence module 18 will then apply some sort of interpolation to produce a pixel background confidence measure bikbg for the current pixel.

Meanwhile, the neighbor motion vector module 14 selects the neighbor block motion vectors around the current pixel, in this example Blk0, Blk1, Blk2 and Blk3. In the first examples here, four neighbor motion vectors are used, but variations of that will be discussed later. Those four block motion vectors will be sent to motion vector data module 20 to get P1 and CF data, pixp1[i] and pixcf[i]. The background motion vector module 16 takes the background motion vector of the current block and sends it to motion vector data module 20 to get P1 and CF data, pixbgp1 pixbgcf. The motion vector data module 20 also uses zero motion vectors to get P1 and CF data, pixstillp1 and pixstillcf. Similarly, the occlusion module 22 takes the occlusion confidence measure kocc and the position information to produce an occlusion confidence measure for each of the neighbor blocks.

Returning to the pixel background confidence measure bikbg, the pixel background module 26 uses that measure to determine which of the background signals pixbgp1 and pixbgcf should be selected as the pixel background signal pixbg. If bikbg is larger than zero, the pixbgp1 is selected. Otherwise, pixbgcf is selected. The signal bikbg is provided to the weighting module 36. Similarly, the phase blending module 28 takes the still data for P1 and CF and selects between them based upon the interpolated phase to produce pixstill. This is also provided to the weighting module 36.

Figure 3:
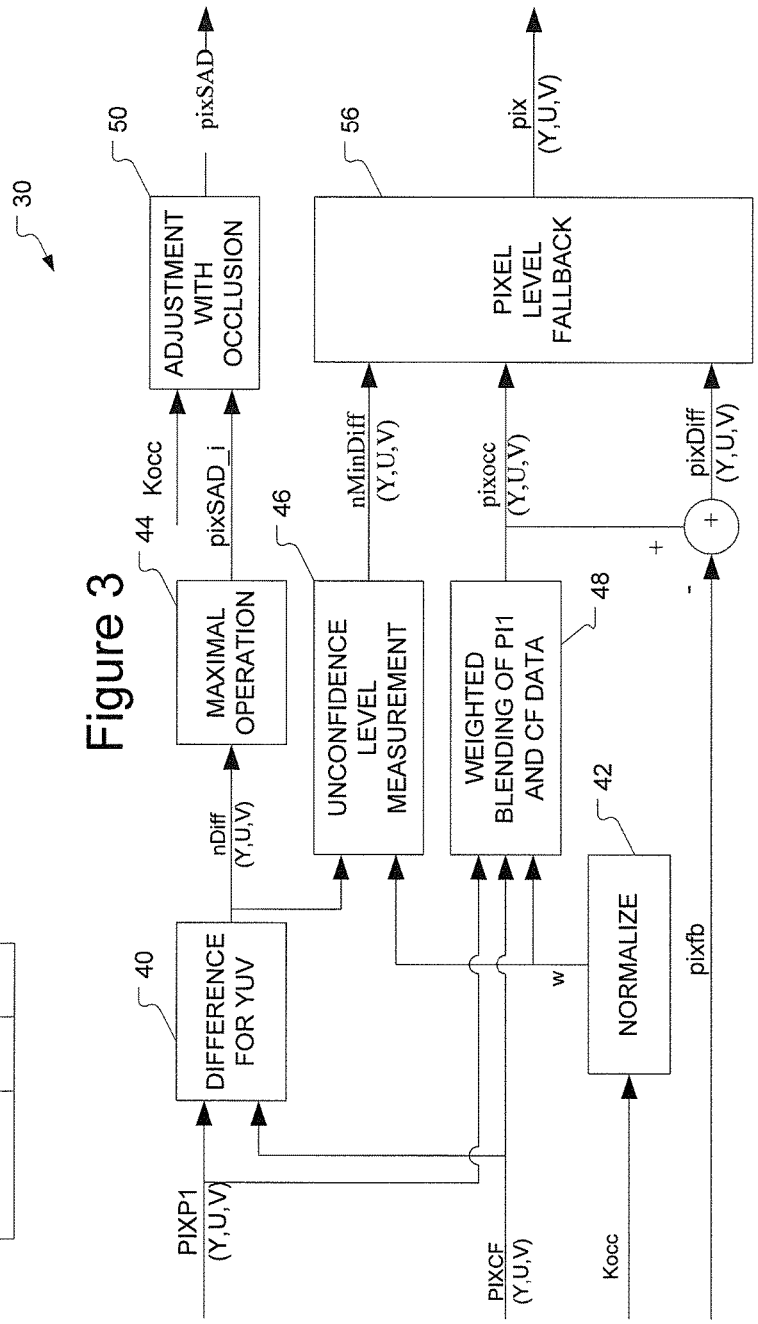
FIG. 3 shows an embodiment of a module to produce interpolated pixel data for each motion vector.

The weighting module 36 takes pixbg and pixstill and the absolute value of bikbg. If the absolute value of bikbg is large, more weight is given to pixbg. The resulting signal pixfb, is the fallback signal mentioned above The pixel motion vector units such as 30, take the pixfb signal, one of the occlusion confidence measure for a particular neighbor block, and the P1 and CF data for that particular neighbor block. The units then produce an interpolated pixel data pix[i] and a difference measure pixSAD[i] for each neighbor block's motion vector. FIG. 3 shows one embodiment of this pixel motion vector unit.

Difference unit 40 calculates the abs difference of P1 pixel and CF pixel for each component (Y, U, V). The maximal operation unit 44 combines each component's difference to get a final difference pixSAD_i which will be sent to adjustment module 50. Adjustment module 50 decreases its value when the current block motion vector has a large value for ABS(kocc) to give more weight to the coming from background region. The final pixSAD difference measure will be sent to the weight calculation module 32 in FIG. 1.

Normalize module calculates a weight according to the kocc value. For example, kocc has a value range from −16 to 16, where a positive value means cover and negative value means uncover. The weight w may be something similar to (16+kocc)/32. The weighting blending module 48 blends P1 pixel and CF pixel according to w value, and large positive w value means use more P1 pixel data.

The weighted blending module 48 produces pixocc. For non-occluded regions, pixp1 and pixcf should have the same value, and the occluded region, pixocc should be either pixp1 or pixcf. Therefore, pixocc must be close to either pixp1 or pixcf for both the non-occluded region and occluded region. Otherwise the result pixocc does not have high confidence, because either the motion vector is wrong for the non-occluded region so a blend of the two results in a value that is significantly different than either P1 or CF, or kocc is not large enough. Therefore CF and P1 are very different, which also results in a large difference.

Unconfidence unit 46 measures the un-confidence level for each component may use formulas similar to:

$$nMinDiff\_y = \min(1-w, w) * nDiff\_y$$

$$nMinDiff\_u = \min(1-w, w) * nDiff\_u$$

$$nMinDiff\_v = \min(1-w, w) * nDiff\_v$$

Here w is value range from 0 zero 1.

The pixel level fallback module 56 generates an interpolated pixel data pix[i] according to nMinDiff, pixocc and pixfb for the motion vector of BlkMV[i]. Module 56 tries to adjust the result toward pixfb under the limitation of the nMinDiff value. Example formulas include:

$$Pix = (pixocc - \min(pixDiff, nMinDiff)), \text{ if } pixDiff \geq 0$$

$$Pix = (pixocc + \min(-pixDiff, nMinDiff)), \text{ if } pixDiff < 0$$

Returning to FIG. 1, a set of modules such as 30 will calculate results for each of the predetermined number of neighbor blocks, in this example four block motion vectors. PixSAD[0-3] will be sent to the weighting unit 32, and pix[0-3] will be sent to the blending unit 34.

Figure 4:
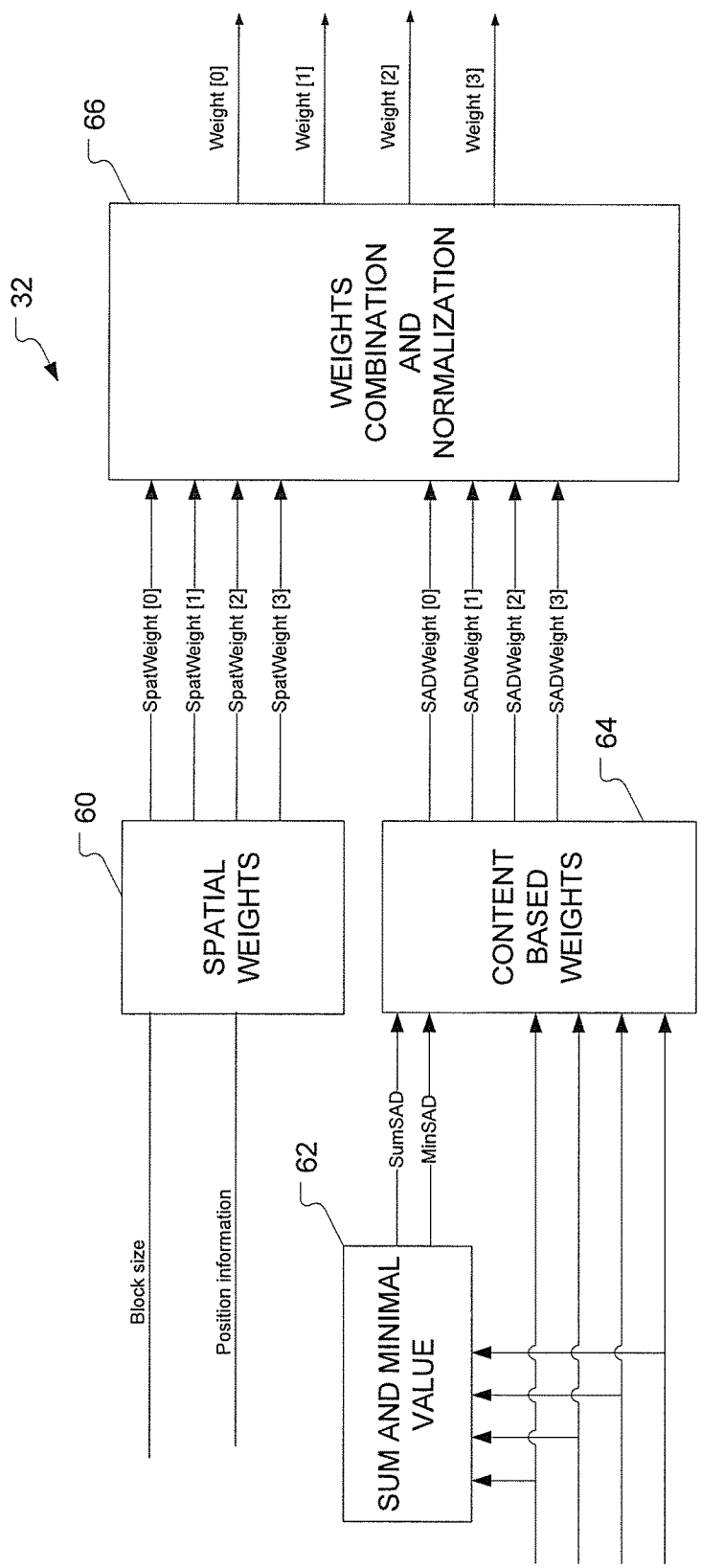
FIG. 4 shows an embodiment of a weighting module.

The weighting calculation module 32 calculates the weights for each block motion vector. Both spatial based weight and image content based weight will be used here, and will be combined to get a single weight wi, where i denotes the number of the neighbor block. FIG. 4 shows an embodiment of a weighting calculation unit such as 32.

Module 60 performs spatial weight calculation. One assigns a weight to the result of each motion vector according its distance from the block center to the interpolated pixel. With spatial weighting, issues caused by a different block motion vector can be reduced. For the pixel 38 in FIG. 2, for example, spatial weights of four neighboring motion vectors may be:

weight for Blk0'MV: spatWeight[0]=$(dx*dy)/(bhsize*bvsize)$ weight for Blk1'MV: spatWeight[1]= $((bhsize-dx)*dy)/(bhsize*bvsize)$ weight for Blk2'MV: spatWeight[2]=$(dx*(bvsize-dy))/(bhsize*bvsize)$ weight for Blk3'MV: spatWeight[3]=$((bhsize-dx)*(bvsize-y))/(bhsize*bvsize)$.

Here bhsize denotes the block size for each motion vector in the horizontal direction, and bvsize denotes the block size for each motion vector in the vertical direction.

The sum and minimal value module 62 and the content based weights 64 show the content based weight calculation. The sum and minimal value module calculates the sum of pixSAD[i] and find the minimal value among those pixSAD[i]. The value SumSAD will limited by a threshold. The content based weights module 64 performs the weight calculation:

SADweight[$i$]=max(1,max($k1$*minSAD,SumSAD−PixSAD[$i$]))

Therefore, a motion vector with large pixSAD will have a small weight, and a small pixSAD will correspond to large weight.

After spatial weight and content based weight calculation, these two kinds of weight are combined together by the weights combination and normalization module 66. One can calculate four initial weights for each block motion vector:

init_weight[0]=spatweight[0]*SADweight[0]

init_weight[1]=spatweight[1]*SADweight[1]

init_weight[2]=spatweight[2]*SADweight[2]

init_weight[3]=spatweight[3]*SADweight[3].

This results in a sum for those four weights:

sum_weight=init_weight[0]+init_weight[1])+init_weight[2])+init_weight[3].

One can then perform normalization to get a final weight for each block motion vector:

$w0$=init_weight[0]/sum_weight;

$w1$=init_weight[1]/sum_weight;

$w2$=init_weight[2]/sum_weight;

$w3$=init_weight[3]/sum_weight.

Returning to FIG. 1, the weight calculation module 32 then provides this to the blending module 34, where weights and pixel results are combined to get the final result, pixout. In alternative approaches, the weighting may be based upon a group of pixels or a lower resolution version of the image.

Figure 5:
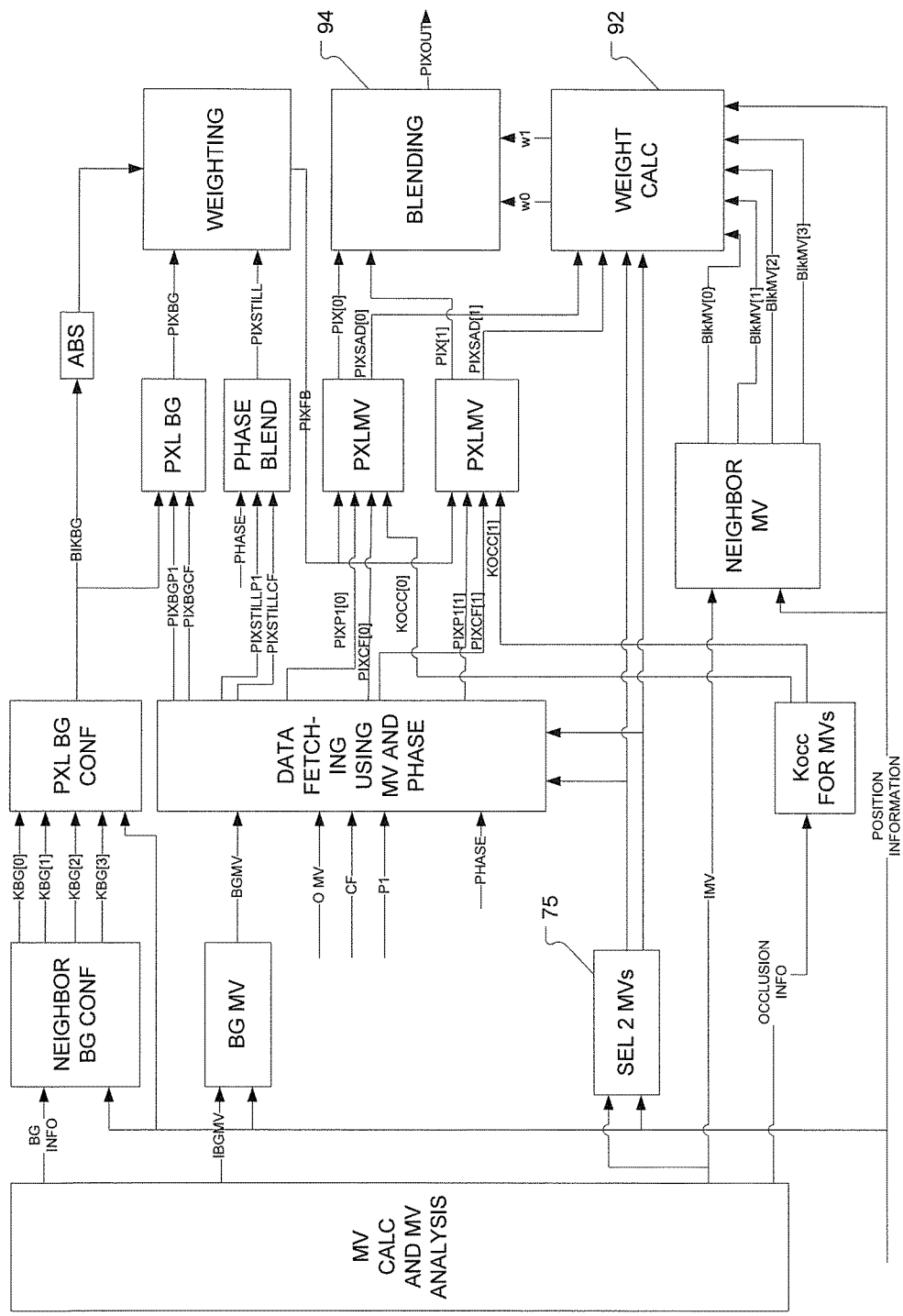
FIG. 5 shows an alternative embodiment of a system to perform frame interpolation of image data using pixel adaptive blending.

As mentioned above, the above process uses four neighbor blocks' motion vectors. To reduce the cost caused by the extra processing power needed for four motion vectors, the process can only use two block motion vectors instead of four. FIG. 5 shows an alternative embodiment for the system of FIG. 1.

The architecture has been altered to include a selection module 75 to select two motion vectors instead of four. For the current pixel 38 in FIG. 2, the motion vector of Blk3 will be used because Blk3 is the block in which the current pixel resides. It will be selected as motion vector SelMV[0]. The process then selects one motion vector that has the largest difference with SelMV[0] from motion vectors of Blk0, Blk1 and Blk2.

Figure 6:
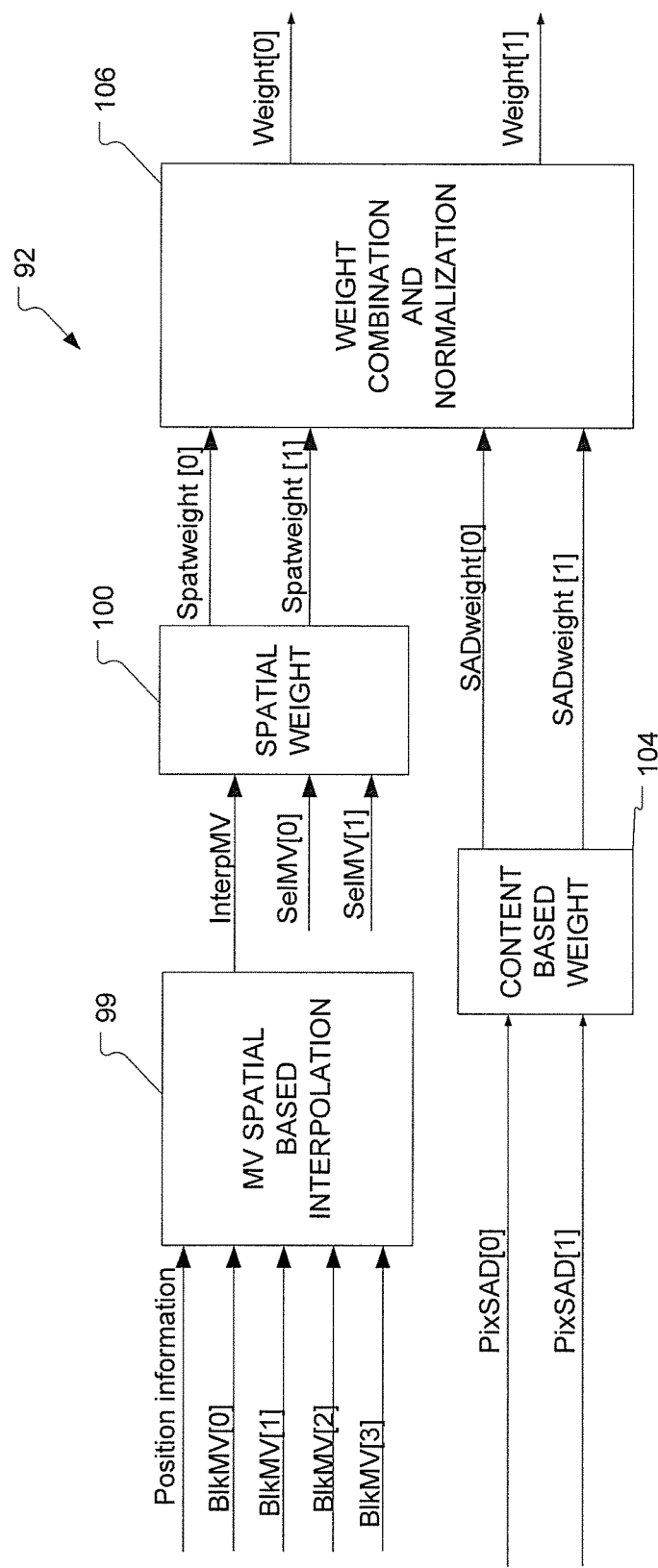
FIG. 6 shows an alternative embodiment of a module to produce interpolated pixel data for each motion vector.

The weights calculation module 92 calculates weights for each motion vector, as shown in more detail in FIG. 6. The motion vector spatial based interpolation module 99 performs motion vector bilinear interpolation according to spatial position and block motion vectors. The spatial weight module calculates spatial weight. In this context, SelMV[0] is the motion vector of the block where the current pixel resides, and SelMV[1] is the motion vector that has the largest difference with SelMV[0] among other the other motion vectors.

The spatial weight module 100 calculates two differences:

Dist0=1+abs(Interp$MV.x$−SelMV[0]$.x$)+abs(Interp$MV.y$−SelMV[0]$.y$)

Dist1=1+abs(Interp$MV.x$−SelMV[1]$.x$)+abs(Interp$MV.y$−SelMV[1]$.y$)

The spatial weight is then:

SpatWeight[0]=16*dist1/(dist0+dist1)

SpatWeight[1]=16*dist0/(dist0+dist1).

The content based weight module 104 then calculates SAD related weight according to the SAD value. For example:

SADweight[$i$]=max(0,15−$k$*PixSAD[$i$])

The weights combination and normalization module 106 then combines those two kinds of weights into a single weight for each motion vector. For example:

$w0$=max(0,min(16,Spatweight[0]+SADweigh[0]−SADweighg[1]));

$w1$=16−$w0$.

Returning to FIG. 5, one can see that the weights w0 and w1 are used by the blending module 94 to produce the final pixel result pixout.

In this manner, the proper motion vector is selected and used to produce a more accurate interpolated pixel. Further, the process and apparatus disclosed here uses both spatial and content based information in the selection process, resulting in a more accurate weighting used in the interpolation process.

Thus, although there has been described to this point a particular embodiment for a method and apparatus for frame interpolation of image data, it is not intended that such specific references be considered as limitations upon the scope of this invention except in-so-far as set forth in the following claims.

What is claimed is:

1. A method of interpolating pixel data for a current pixel, comprising:
   selecting neighbor motion vectors from blocks that are neighbor blocks of the current pixel;
   producing interpolated pixel data for each neighbor motion vector, wherein the interpolated pixel data includes multiple candidate pixel values for a particular pixel location, one candidate pixel value for each neighbor motion vector, and producing interpolated pixel data comprises:
   finding a difference between data from a current phase and data from a previous phase using a block size for the current block and position information of the current pixel as spatial information;
   normalizing occlusion information to produce a weight;
   determining an unconfidence measurement using the difference and the weight;
   blending data from the current phase and the previous phase according to the weight to produce a pixel occlusion measure; and
   producing the interpolated pixel data for each block motion vector from the pixel occlusion measure, the fallback pixel and the unconfidence measure;
   applying a different image content weighting to each candidate pixel value, wherein the image content weighting is based upon image content in a neighborhood pointed to by a motion vector;

applying a spatial distance weighting to each candidate pixel value, wherein the spatial weighting for each candidate pixel value is based upon a spatial position of a center of the neighbor block corresponding to the neighbor motion vector used to produce the candidate pixel value, to produce weighted candidate pixel values for the current pixel; and blending each of the candidate pixel values for the current pixel, producing pixel data for the current pixel, selecting neighbor motion vectors from blocks that are neighbor blocks of the current pixel.

2. The method of claim 1, further comprising determining a fallback pixel based upon neighbor motion vector information.

3. The method of claim 2, wherein determining a fallback pixel further comprises:

receiving background motion vector confidence measures for a predetermined number of blocks neighboring the current pixel;

applying an interpolation to produce a pixel background confidence measure for the current pixel from the background motion vector confidence measures;

finding a pixel background value and a pixel still value; and blending the pixel background value and the pixel still value according to the pixel background confidence measure for the current pixel to determine the fallback pixel.

4. The method of claim 3, wherein interpolating a pixel background confidence measure comprises applying bilinear interpolation to produce the background motion vector confidence measures.

5. The method of claim 3, wherein finding a pixel background value comprises using a background motion vector for a current block in which the current pixel resides and pixel data from a current and previous phase.

6. The method of claim 3, wherein finding a pixel still value comprises using a zero motion vector for a current block in which the current pixel resides and pixel data from a current and previous phase.

7. The method of claim 2, wherein producing the interpolated pixel data includes using the fallback pixel.

8. The method of claim 1, wherein producing the interpolated pixel data includes using occlusion information about each neighbor block motion vector.

9. The method of claim 1, wherein producing the interpolated pixel data includes using neighbor background motion vector information.

10. The method of claim 1, wherein producing the interpolated pixel data includes using phase information from a current and a previous phase for each neighbor motion vector.

11. The method of claim 10, wherein producing the interpolated pixel data includes using a pixel difference measure for each neighbor motion vector.

12. The method of claim 1, wherein using occlusion information comprises using an occlusion confidence measure.

13. The method of claim 1, wherein using the difference measure and spatial information comprises using a sum of absolute differences as the difference measure.

14. The method of claim 1, wherein four neighbor motion vectors are used.

15. The method of claim 1, wherein two neighbor motion vectors are used.

16. The method of claim 15, further comprising selecting the two neighbor motion vectors.

17. The method of claim 16, wherein selecting the two neighbor motion vectors comprises:

selecting a motion vector for a current block in which the current pixel resides as a first motion vector;

selecting a neighbor motion vector from a predetermined motion vector based upon the neighbor motion vector having a large difference from others of the predetermined motion vectors.

18. An apparatus, comprising:

a neighbor motion vector module arranged to receive motion vector data for blocks that neighbor a current pixel and select a predetermined number of block motion vectors;

at least two pixel motion vector modules arranged to receive the block motion vector data and to produce interpolated pixel motion vector data for each block motion vector, wherein the interpolated pixel motion vector data includes multiple candidate pixel values for a particular location;

a weighting module configured to apply a spatial distance weighting to each candidate pixel value, wherein the spatial weighting for each candidate pixel value is based upon a spatial position of a center of the neighbor block corresponding to the neighbor motion vector used to produce the candidate pixel value, and to apply an image content weighting to each candidate pixel value, wherein the image content weighting is based upon a difference for each candidate pixel value between a previous frame pixel value and a future frame pixel value based upon the neighbor motion vector; and a blending module to blend the interpolated pixel motion vector data according to the weighting and to produce interpolated pixel output data for the current pixel, wherein producing interpolated pixel output data comprises:

finding a difference between data from a current phase and data from a previous phase using a block size for the current block and position information of the current pixel as spatial information;

normalizing occlusion information to produce a weight;

determining an unconfidence measurement using the difference and the weight;

blending data from the current phase and the previous phase according to the weight to produce a pixel occlusion measure; and producing the interpolated pixel data for each block motion vector from the pixel occlusion measure, the fallback pixel and the unconfidence measure.

* * * * *